US010963952B2

(12) United States Patent
Born et al.

(10) Patent No.: US 10,963,952 B2
(45) Date of Patent: Mar. 30, 2021

(54) AUGMENTED REALITY-BASED REAL ESTATE PROPERTY ANALYSIS

(71) Applicant: SAP SE, Walldorf (DE)

(72) Inventors: Torsten Born, Altlussheim (DE); Jan Gabriel, Böhl-lggelheim (DE); Sebastian Netuschil, Heidelberg (DE); Volker Obry, Neustadt Weinstrasse (DE); Karin Brecht-Tillinger, Ladenburg (DE); Pierre Fritsch, Karlsruhe (DE)

(73) Assignee: SAP SE, Walldorf (DE)

( * ) Notice: Subject to any disclaimer, the term of this patent is extended or adjusted under 35 U.S.C. 154(b) by 161 days.

(21) Appl. No.: 16/208,078

(22) Filed: Dec. 3, 2018

(65) Prior Publication Data

US 2020/0175576 A1 Jun. 4, 2020

(51) Int. Cl.
*G06Q 30/06* (2012.01)
*G06T 19/00* (2011.01)
*G06Q 50/16* (2012.01)

(52) U.S. Cl.
CPC ..... *G06Q 30/0643* (2013.01); *G06Q 30/0603* (2013.01); *G06Q 30/0631* (2013.01);
(Continued)

(58) Field of Classification Search
CPC ..... G06Q 30/06; G06Q 30/0601–0643; G06Q 50/16–163; G06T 19/00; G06T 19/003;
(Continued)

(56) References Cited

U.S. PATENT DOCUMENTS 7,370,007 B2 5/2008 Schwarze et al.
7,596,543 B2 9/2009 Lange et al.
(Continued)

OTHER PUBLICATIONS

Make it home: automatic optimization of furniture arrangement. Yu et al. ACM Transactions on Graphics (TOG)—Proceedings of ACM SIGGRAPH 2011, v. 30,(4), Jul. 2011, article No. 86 (Year: 2011).*
(Continued)

*Primary Examiner* — William J Allen
(74) *Attorney, Agent, or Firm* — Fish & Richardson P.C.

(57) ABSTRACT

The present disclosure relates to computer-implemented methods, software, and systems for using augmented reality-based operations to interact with and analyze real estate property, including modifications and additions to the interior of the property. One example method includes receiving, from an augmented reality-enabled application, a request identifying at least one digital improvement associated with a particular real estate property. A set of characteristics associated with the at least one digital improvement are identified, and a response including at least a portion of the identified set of characteristics associated with the at least one digital improvement and a digital object representing the at least one digital improvement is transmitted to the augmented reality-enabled application. The digital object can visually represent the at least one digital improvement, and can be inserted in an augmented reality-based presentation of the particular real estate property using the augmented reality-enabled application.

20 Claims, 5 Drawing Sheets

(52) U.S. Cl.
CPC ........... G06Q 50/16 (2013.01); G06T 19/006 (2013.01); *G06Q 30/0611* (2013.01); *G06T 2210/04* (2013.01)

(58) Field of Classification Search
CPC ....... G06T 19/006; G06T 19/20; G06T 15/00; G06T 15/005; G06T 2210/04; G06N 3/02; G06N 3/08; G06N 20/00–20
See application file for complete search history.

(56) References Cited

U.S. PATENT DOCUMENTS

| | | | |
|---|---|---|---|
| 7,725,354 B2 | 5/2010 | Schwarze et al. | |
| 7,962,920 B2 | 6/2011 | Gabriel et al. | |
| 8,060,411 B2 | 11/2011 | Shestakov et al. | |
| 8,315,900 B2 | 11/2012 | Schwarz et al. | |
| 8,326,702 B2 | 12/2012 | Herrmann et al. | |
| 8,380,553 B2 | 2/2013 | Berger et al. | |
| 8,396,731 B2 | 3/2013 | Berger et al. | |
| 8,401,928 B2 | 3/2013 | Herrmann et al. | |
| 8,676,617 B2 | 3/2014 | Berger et al. | |
| 10,304,254 B2* | 5/2019 | Jovanovic | G06F 3/04815 |
| 10,645,275 B1* | 5/2020 | Chuah | H04N 5/232933 |
| 2002/0010655 A1* | 1/2002 | Kjallstrom | G06Q 30/02 705/26.62 |
| 2008/0155556 A1 | 6/2008 | Gabriel et al. | |
| 2010/0070556 A1 | 3/2010 | Heusermann et al. | |
| 2012/0173384 A1 | 7/2012 | Herrmann et al. | |
| 2012/0231424 A1* | 9/2012 | Calman | G09B 25/04 434/72 |
| 2016/0132948 A1* | 5/2016 | Saveliev | G06Q 10/0875 705/26.4 |
| 2018/0060505 A1 | 3/2018 | Gabriel et al. | |
| 2018/0336619 A1* | 11/2018 | Bhandari | G06Q 30/0631 |
| 2018/0336732 A1* | 11/2018 | Schuster | G06Q 10/063118 |
| 2019/0130464 A1* | 5/2019 | Yao | G06F 7/026 |
| 2019/0197599 A1* | 6/2019 | Zia | G06T 19/006 |
| 2020/0090253 A1* | 3/2020 | Desrosiers | G06Q 30/0635 |
| 2020/0117335 A1* | 4/2020 | Mani | G06F 3/012 |

OTHER PUBLICATIONS

The App That Measures and Maps the Rooms in Your Home. Peter Martin. Jan. 26, 2018. (Year: 2018).*

* cited by examiner

AUGMENTED REALITY-BASED REAL ESTATE PROPERTY ANALYSIS

TECHNICAL FIELD

The present disclosure relates to computer-implemented methods, software, and systems for using augmented reality-based operations to interact with and analyze real estate property, including modifications and additions to the interior of the property.

BACKGROUND

The purchasing or renting of real estate property requires buyers or renters to use their imagination in determining, if purchased or rented, how a particular location can be transformed. In many situations, such determinations may cause price and timing expectations to greatly differ from reality.

Augmented reality (AR) is an interactive experience of a real-world environment where the objects that reside in the real world are augmented by computer-generated perceptual information, including visual and auditory information. In many instances, augmenting can include overlaying information onto a visual or video presentation.

SUMMARY

The present disclosure involves systems, software, and computer-implemented methods for using augmented reality-based operations to interact with and analyze real estate property, including modifications and additions to the interior of the property. One example system includes receiving, from an augmented reality-enabled application, a request identifying at least one digital improvement associated with a particular real estate property. A set of characteristics associated with the at least one digital improvement are identified. A response is then transmitted to the augmented reality-enabled application which includes at least a portion of the identified set of characteristics associated with the at least one digital improvement and a digital object representing the at least one digital improvement, wherein the digital object representing the at least one digital improvement is configured to be visually inserted in an augmented reality-based presentation of the particular real estate property using the augmented reality-enabled application.

Implementations can optionally include one or more of the following features. In some instances, the at least one digital improvement comprises a particular product to be placed within the augmented reality-based presentation of the particular real estate property. In some of those instances, identifying the set of characteristics associated with the at least one digital improvement can comprise accessing a product catalog associated with at least one retailer associated with the particular product and identifying the set of characteristics associated with the particular product, wherein the set of characteristics of the at least one digital improvement includes at least one price of the particular product. In some of those instances, the product catalog includes two or more retailers associated with the particular product, and wherein the identified set of characteristics includes an indication of the prices offered by each of the two or more retailers. Alternatively, the set of characteristics associated with the at least one digital improvement includes at least two selectable options associated with the particular product, wherein transmitting the response includes transmitting at least a portion of the identified set of characteristics associated with each of the at least two selectable options for the at least one digital improvement.

In some instances, the at least one digital improvement comprises a physical improvement to be made within the particular real estate property, and the digital object representing the at least one digital improvement comprises a visual modification to a portion of the particular real estate property associated with the physical improvement within the augmented reality-based presentation of the particular real estate property. In some of those instances, identifying the set of characteristics associated with the at least one digital improvement can include identifying at least one contractor associated with a geographic area in which the particular real estate property is located and registered as capable of performing the physical improvement and obtaining a price associated with the physical improvement from the at least one identified contractor, wherein the response includes the obtained price. In some of those instances, at least two different contractors are identified, and obtaining the price associated with the physical improvement from the at least two different contractors can comprise identifying at least two different quotes for the physical improvement.

In some instances, identifying the set of characteristics associated with the at least one digital improvement can comprise identifying two or more providers associated with the at least one digital improvement associated with a particular real estate property, transmitting, to each of the two or more providers, a request for a real-time quote associated with the at least one digital improvement, receiving, from each of the two or more providers, quotes for the at least one digital improvement, and transmitting, to the augmented reality-enabled application, information associated with the received quotes for presentation.

In some instances, the digital object representing the at least one digital improvement is associated with a set of dimensions, wherein the augmented reality-enabled application is configured to determine dimensions of a location within the particular real estate property at which the at least one digital improvement is to be placed, determine whether the set of dimensions of the digital object representing the at least one digital improvement can fit within the dimensions of the location within the particular real estate property, and present, within an augmented reality presentation, an indication of the determination whether the set of dimensions of the digital object representing the at least one digital improvement can fit within the dimensions of the location within the particular real estate property.

In some instances, in response to receiving the request identifying the at least one digital improvement associated with a particular real estate property, the method further comprises identifying at least one additional item based on the identification of the at least one digital improvement and transmitting, to the augmented reality-enabled application, a notification associated with a recommendation of the at least one additional item for presentation via the augmented reality-enabled application, wherein the notification includes a digital object representing the at least one identified additional item.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer-implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
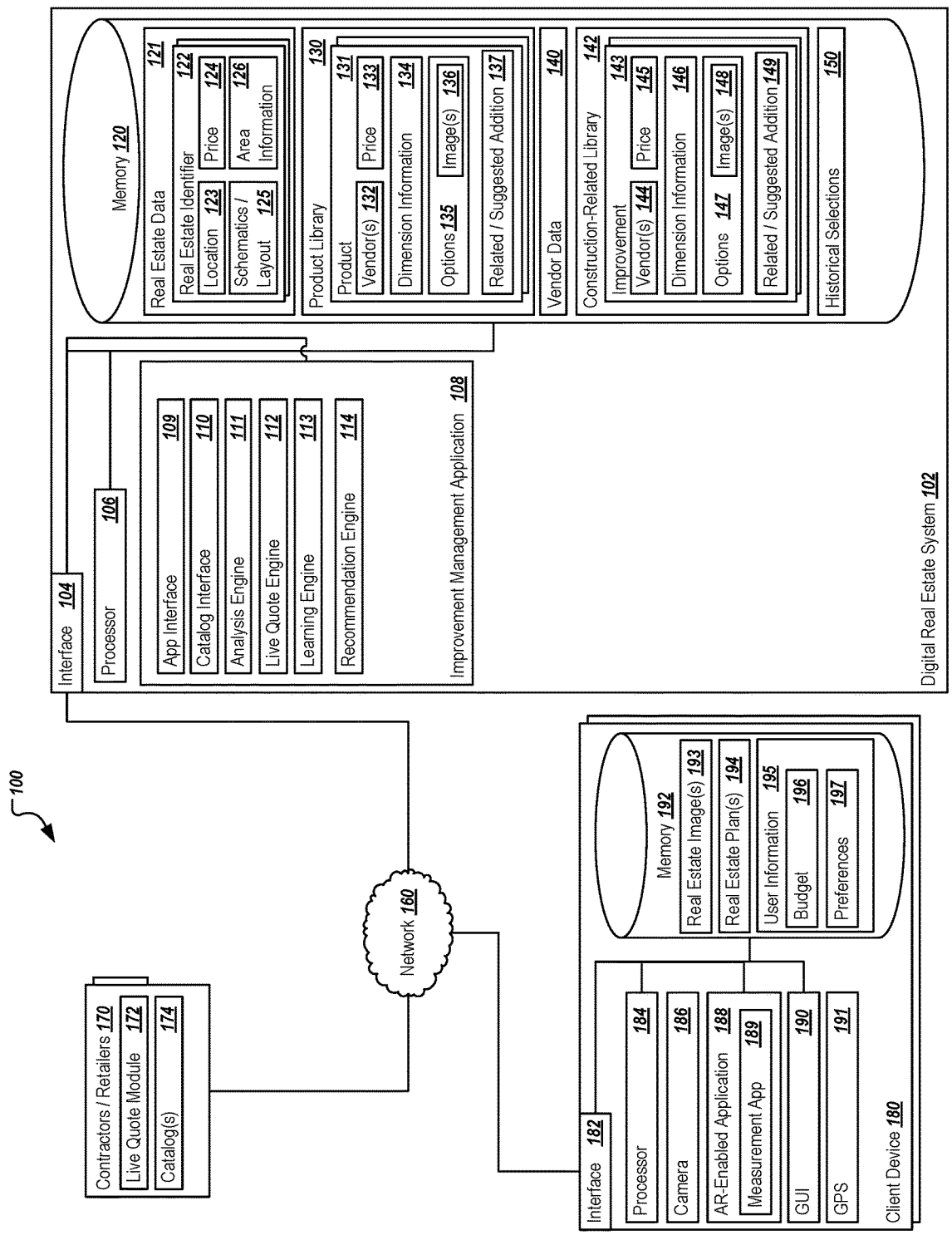
FIG. 1 is a block diagram illustrating a system for integrating one or more improvements into an augmented reality-based visualization of a real estate property.

The present disclosure describes various tools and techniques for using augmented reality-based operations to interact with and analysis real estate property, including modifications and additions to the interior of the property. In other words, the present disclosure and solutions attempt to provide a tangible process to consumers to interact with potential living locations by identifying and placing potential objects (e.g., furniture) and improvements (e.g., fireplaces, structure modifications, etc.) at locations within the real estate. In particular, using augmented reality (AR) solutions, visualizations of particular objects and improvements can be inserted into a visualization of the property. The visualization can be provided immediately in real-time based on models and visualizations of the objects and/or improvements, and can be reflected within a suitable application. Through the visualization and AR solutions, indications of whether selected objects and/or improvements fit the space, both in dimension and style, can be determined while at the location, where appropriate. Further, connections to one or more pricing catalogs can allow consumers to understand the costs of particular choices, including additional or hidden costs, such as additional insurance that may be needed, additional costs required by the placement of a selection (e.g., wiring, demolition, etc.), and others associated with the selection. Still further, additional suggestions or modifications, including other objects or improvements to be made, can be proposed based on learned behavior of other consumers, which can be based on selections in similar areas, in similar demographics, or in similar real estate, among others. In some instances, the suggestions or modifications may be based on a first selection within the property. In other instances, however, the suggestions may be provided before a selection is made based on the property itself and/or the preferences of or information about the consumer.

The present solution can be used in connection with current real estate agencies, or can be used to provide digital real estate agencies. Alternatively, the present solution can be used by interior decorators or house-flippers to perform an initial style and cost-based analysis of one or more improvements.

In some instances, proposed pricing associated with a particular improvement may be initially provided as an estimate based on one or more prior quotes, or based on static information in a database or catalog. In combination with the immediate pricing, information about the selections of objects and improvements can be provided to one or more vendors (e.g., merchants, contractors, etc.) in a live quote system. Information about the real estate and the consumer can be passed to at least one of the vendors, who can perform a real-time quote estimate based on imagery or video capture in combination with the particular selections of the consumer. Using connections to a centralized or cloud-based system, users at those vendors can provide more detailed or specific costs associated with particular selections, including for the selection itself and other expenses or actions associated with that selection.

The described solution can also incorporate machine learning to provide significant recommendations based on other consumer's selections. The location of a property may determine certain styles or selections popular in an area, and can result in suggestions similar to those selected by others. Demographic information about the consumer can also be used to identify particular furniture or changes that may need to be recommended, either based on other consumers of the same demographics, or based on the consumer's personal circumstance. For example, if a consumer has small children, one or more child-proofing improvements may be identified and recommended. In some instances, some of the recommendations may be automatically applied when viewing the property, and can be factored into the initial cost estimates of the property during the viewing. Further, information about the location may identify certain characteristics, such as a higher than normal property crime rate. Based on that rate, security-related improvements may be suggested or included in the visualizations, including a security system, a change in locks, a tinting of a door window, or other possible selections.

Using the solution, including by incorporating it into current real estate solutions, can provide consumers and sellers the benefits of combining relevant information from a plurality of unrelated sources into the AR-enabled app. By providing information at the time of visiting a location, the application and infrastructure can allow quicker decisions by consumers and link companies and providers with additional opportunities to originate business.

Current applications leveraging AR functionality focus on embedding objects in the environment, and are not connected to subsequent retail processes. The application described herein could be connected to one or more online merchant stores or, eCommerce applications and systems (e.g., Amazon, Wayfair, Pottery Barn, Ikea, etc.), contractor systems, insurance providers, security system installers, and other systems, and can allow consumers to get quotes from each.

Turning to the illustrated example implementation, FIG. 1 is a block diagram illustrating a system 100 for integrating one or more improvements into an augmented reality-based visualization of a real estate property. System 100 includes functionality and structure associated with selected components in an example cloud- or on-demand system, allowing integration through a plurality of related and unrelated systems. As illustrated, a digital real estate system 102 can perform backend operations and functionality associated with a plurality of systems and catalogs to provide information related to one or more pieces of real estate, a set of products, and one or more contractors or other service-based entities. The digital real estate system 102 may connect to one or more contractors or retailer systems 170 to obtain real-time or updated information, and can provide that information to users or consumers at one or more client devices 180. Using the client devices 180, images associated with a particular real estate location and its interior (or exterior) can be captured or otherwise provided. An AR-enabled application 188 can provide information about a particular location within the real estate property at which an improvement or change is selected, and can, using information stored at the device 180, or from libraries located at the backend system 102, or available from one or more contractor or retailer systems 170, present one or more optional improvements via the graphical user interface (GUI) 190 for selection. In response to the selection, an image or visualization associated with the selected improvement can be identified and placed within an augmented reality presentation at the client device 180. In addition to the presentation, the AR-enabled application 188 or an improvement management application 108 executing at the backend system 102 can determine whether the size of the selected improvement fits in the location. Further, additional properties and options associated with the selected improvement can be identified and provided to the consumer for consideration.

As illustrated, system 100 includes or is communicably coupled with one or more client devices 180, the digital real estate system 102, and one or more contractor or retailer systems 170, each connected via network 160. System 100 is a single example of possible implementations, with alternatives, additions, and modifications possible for performing some or all of the described operations and functionality. Although shown separately, in some implementations, functionality of two or more systems, servers, or illustrated components may be provided by a single system or server. In some implementations, the functionality of two or more systems, servers, or illustrated components may be provided by a single component, system, or server. In some implementations, the functionality of one illustrated system or server may be provided by multiple systems, servers, or computing devices, including those physically or logically local or remote to each other. Any combination or permutation of systems may perform the functionality described herein.

As used in the present disclosure, the terms "computer" or "computing device" are intended to encompass any suitable processing device. For example, client device 180 and the digital real estate system 102 may be any computer or processing device (or combination of devices) such as, for example, a blade server, a general-purpose personal computer (PC), MAC, workstation, UNIX-based workstation, embedded system or any other suitable device. Moreover, although FIG. 1 illustrates particular components as a single element, those components may be implemented using a single system or more than those illustrated, as well as computers other than servers, including a server pool or variations that include distributed computing. In other words, the present disclosure contemplates computers other than general-purpose computers, as well as computers without conventional operating systems. For example, the digital real estate system 102 may be any system which can request data, execute an application (e.g., improvement management application 108), and communicate with the contractor or retailer systems 170 and the client devices 180. The client device 180, in some instances, may be any other suitable device, including a mobile device, such as a smartphone, a tablet-computing device, a smartwatch, a laptop/notebook computer, a connected device, or any other suitable device. Additionally, the client device 180 may be a desktop or workstation, server, or any other suitable device. While described as executed via an AR-enabled application 188 executing on the client device 180, the AR-enabled application 188 may be accessed remotely by the client device 180, and may include a web page, a web application, or any other remotely executing application. The digital real estate system 102 may be a server or a set of servers, a cloud-based application or system, or any other suitable system or combination of systems. In some instances, the AR-enabled application 188 may execute on or be associated with a system executing the digital real estate system 102. In general, each illustrated component may be adapted to execute any suitable operating system, including Linux, UNIX, Windows, Mac OS®, Java™, Android™, Windows Phone OS, or iOS™, among others.

In general, the digital real estate system 102 can be generally associated with the execution of one or more other business applications. The business applications may be any suitable applications, including non-business applications. At least some of the business applications may be an enterprise application or applications in some instances, and can include but are not limited to an enterprise resource planning (ERP) system, a customer relationship management (CRM) system, a supplier relationship management (SRM) system, a supply chain management (SCM) system, a product lifecycle management (PLM) system, or any other suitable system. In some instances, the digital real estate system 102 can be associated with and can integrate a combination of at least some of these systems as part of an end-to-end enterprise application or portion thereof.

In particular, the digital real estate system 102 performs operations and functionality associated with the AR-enabled application 188 executing at the client device 180. The digital real estate system 102, as illustrated, includes an interface 104, at least one processor 106, an improvement management application 108, and memory 120.

Interface 104 is used for communicating with other systems in a distributed environment—including within the system 100, connected to the digital real estate system 102 and/or network 160, as well as other systems or components communicably coupled to the network 160. Generally, the interface 104 includes logic encoded in software and/or hardware in a suitable combination and operation to communicate with the network 160 and other communicably coupled components. More specifically, the interface 104 may comprise software supporting one or more communication protocols associated with communications such that the digital real estate system 102, network 160, and/or the interface's hardware is operable to communicate physical signals within and outside of the illustrated system 100.

Network 160 facilitates wireless or wireline communications between the components of the system 100 (e.g., between combinations of the one or more digital real estate system 102, client device 180, the contractor and retailer systems 170, and/or other components, among others) as well as with any other local or remote computer, such as additional mobile devices, clients, servers, remotely executed or located portions of a particular component, or other devices communicably coupled to network 160, including those not illustrated in FIG. 1. In this illustrated environment, the network 160 is depicted as a single network, but may be comprised of more than one network without departing from the scope of this disclosure, so long as at least a portion of the network 160 may facilitate communication between senders and recipients. In some instances, one or more of the illustrated components (e.g., the digital real estate system 102 and/or at least a portion of the contractor and retailer systems 170) or portions thereof may be included within network 160 as one or more cloud-based services or operations. The network 160 may be all or a portion of an enterprise or secured network, while in another instance, at least a portion of the network 160 may represent a connection to the Internet. In some instances, a portion of the network 160 may be a virtual private network (VPN) or an Intranet. Further, all or a portion of the network 160 can comprise either a wireline or a wireless link. Example wireless links may include 802.11a/b/g/n/ac, 802.20, WiMax, LTE, and/or any other appropriate wireless link. In other words, the network 160 encompasses any internal or external network, networks, sub-network, or combination thereof operable to facilitate communications between various computing components inside and outside the illustrated system 100. The network 160 may communicate, for example, Internet Protocol (IP) packets, Frame Relay frames, Asynchronous Transfer Mode (ATM) cells, voice, video, data, and other suitable information between network addresses. The network 160 may also include one or more local area networks (LAMs), radio access networks (RANs), metropolitan area networks (MANs), wide area networks (WANs), all or a portion of the internet and/or any other communication system or systems at one or more locations.

As noted, the digital real estate system 102 may be any suitable computing device, and may include one or more processors 106. Although illustrated as a single processor 106 in FIG. 1, multiple processors may be used according to particular needs, desires, or particular implementations of the system 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the digital real estate system 102, in particular, those related to executing the various modules or software illustrated therein (e.g., the improvement management application 108) and its related functionality. Specifically, the processor 106 executes the algorithms and operations described in the illustrated figures, as well as the various software modules and functionalities, including the functionality for sending communications to and receiving transmissions from the client devices 180 and the contractor and retailer systems 170, as well as to process and prepare responses to received input from the AR-enabled application 188. Each processor 106 may have a single core or multiple cores, with each core available to host and execute an individual processing thread.

Regardless of the particular implementations, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, Objective-C, JavaScript, Java™, Visual Basic, assembler, Perl®, Swift, HTML5, any suitable version of 4GL, as well as others.

As described, the improvement management application 108 may be any suitable application, program, mobile app, or other component. In general, the improvement management application 108 connects the client device 180 and the AR-enabled application 188 with the various systems involved in the design and presentation process described herein. The improvement management application 108 can perform a variety of operations, and is illustrated as including a plurality of components for performing its functions. As illustrated, the improvement management application 108 includes an application interface 109, a catalog interface 110, an analysis engine 111, a live quote engine 112, a learning engine 113, and a recommendation engine 114. While illustrated as separate components, these elements may be combined into a single component, separated into more components, combined in part, or may be located separate from the either the improvement management application 108 or the digital real estate system 102.

The application interface 109 provides a communication link or interface to the one or more client devices 180 and the AR-enabled applications 188. The applications 188 can provide information about a current property location at which the client device 180 is located or at which a visualization and cost estimate is requested. The application interface 109 can receive information about the property, including a specific identifier or address, and can provide that to the analysis engine 111. Further, information about the particular consumer using the AR-enabled application 188 can be provided. In some instances, user information 195 may be stored at the client device 180, while in others it may be available at the digital real estate system 102 or from other locations. The user information 195 can be used to identify the person or persons interested in the property, which can be used by the analysis engine 111 and the recommendation engine 114 to determine one or more recommendations, options, or potential selections to be provided. When results are generated by the improvement management application 108, those results can be provided back to the client device 180 via the application interface 109.

The catalog interface 110 allows the improvement management application 108 to interact with one or more catalogs of potential products and/or construction-related modifications to be virtually applied through the AR-enabled application 188. In some instances, a product library 130 and/or a construction-related library 142 may be stored local to the digital real estate system 102. In other instances, the information may be stored at one or more contractors or retailer systems 170 as catalog(s) 174. The catalog interface 110 can obtain current pricing, product and improvement information, as well as other data. The catalog interface 110 can provide the information back to the analysis engine 111, where comparisons between retailers and contractors can be made, including which options may be better or more advantageously priced.

In some instances, the catalogs and libraries may be stored in memory 120. In some implementations, the digital real estate system 102 includes a single memory or multiple memories. The memory 120 may include any type of memory or database module and may take the form of volatile and/or non-volatile memory including, without limitation, magnetic media, optical media, random access memory (RAM), read-only memory (ROM), removable media, or any other suitable local or remote memory component. The memory 120 may store various objects or data, include caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the digital real estate system 102. Additionally, the memory 120 may store any other appropriate data, such as VPN applications, firmware logs and policies, firewall policies, a security or access log, print or other reporting files, as well as others. As illustrated, memory 120 includes, for example, real estate data 121, a product library 130, vendor data 140, a construction-related library 142, and a set of historical selections 150. Memory 120 may be local to or remote to the digital real estate system 102, and may be available remotely via network 160, as a cloud-based storage in network 160, with one or more remote repositories, including those of the contractor and retailer systems 170, or elsewhere.

The product library 130 may store information and details about one or more products 131, which can include furniture, decorations, lighting, windows, and other items that may be placed in or added to a particular property. As illustrated, each product 131 may be associated with one or more vendors 132. Each vendor 132 may have different pricing, and the information related to the particular vendor 132 may be used to check pricing on a particular selected product 131. Additional information about particular vendors 132 may be linked or referenced at vendor data 140, where links to one or more vendor systems (e.g., inventories, catalogs 174, and live quote modules 172, among others) may be found and used by the improvement management application 108 for additional information. The price 133 of the product 131 may fluctuate or otherwise change, or a range may be provided. When a particular product 131 is selected at the AR-enabled application 188, an exact price of the product 131 may be provided, or an estimated range of recent or current prices may be provided.

Each product 131 may be associated with dimension information 134, which can be used to determine whether a particular selected product 131 will fit within a space considered by the consumer. In some instances, the dimension information 134 can be used to show the space needed within the property, or can be used to compare the location within or outside the property selected for the product 131. A halo or outline of the product 131 can be presented in the AR-enabled application 188 as overlayed on the particular selected location, and can show how the product 131 may be placed. In some instances, each product 131 may be associated with two or more options 135, including different colors, shapes, models, etc. Each option 135, including where only one option 135 may be available, may be associated with one or more images 136. The images 136 may be two- or three-dimensional (2D or 3D), and can be placed into an augmented reality visualization at the AR-enabled application 188. In response to selection from the consumer, the corresponding image 136 can be provided by the improvement management application 108 for presentation at the device 180. The application 188 may identify that multiple options are available, and can provide the corresponding images 136 as selections are changed.

Each product 131 in the product library 130 may be associated with one or more related or suggested additions 137. Those additions 137 may include additional services or goods that are associated with the particular product 131, or that are commonly added or selected when the particular product 131 is selected. The additions 137 can be manually selected by vendors 132 or other persons or entities, or may be automatically determined or identified by the learning engine 113 as determined, using machine learning and inputs from multiple consumers, to monitor historical selections 150 and identify one or more insights about those selections. The additions 137 may be additional products 131 typically added by other consumers, additional costs or modifications to be included with a product (e.g., such as specific types of insurance, additional insurance, security or safety precautions, or items required to hold or use a particular product 131, among others). In some instances, one or more additions 137 associated with a particular product 131 may include one or more construction-related actions or operations, which can be stored in or associated with a construction-related library 142. For example, if one or more products 131 are selected that are too big for a particular room and a wall may need to be removed or otherwise modified, or if products 131 may require particular wiring or electrical work to be installed, such information may be linked via the suggested addition 137 and can point to a construction-related library 142.

The construction-related library 142 can store, include, or reference information related to a plurality of potential physical improvements 143 that may be made to a property. The improvements 143 may include changes to interior design, removing or adding walls, modifying physical features of the real estate, adding or removing lighting, adding electrical or plumbing, modifying entryways, doors, or windows, or any other suitable physical modification. Various types of improvements 143 may be included, with at least some of those improvements 143 closely tied or related to one or more products 131. In some instances, some of the improvements 143 may be associated with particular products, such as lighting fixtures and electrical work as an example, and may be listed as the addition 137 of a particular product 131. Additionally, one or more improvements 143 may be associated with one or more additions 149 based on learned or defined associations to particular improvements 143. When new lighting installation is selected as an improvement 143 within the AR-enabled application 188, one or more potential products 131 may be included as a suggested addition 149, and can also be returned to the application 188.

Each improvement 143 may be associated with particular vendors 144 or contractors who can perform the work to create the improvement, each of whom may have different estimates of price 145. In some instances, as described with regard to vendors 144, each vendor 144 may be associated with a backend contractor or retailer system 170, and specific information for that contractor may be available for review or inclusion in the presentation at the device 180. Particular dimensions 146 may also be associated with particular improvements 143, including one or more options 147. Each option 147 may be associated with a different price 145, different vendors 144, and different additions 149, depending on the type of improvement 143 and the number of options 147 that may be available. In one example, a new plug may be desired within a wall. Different options may include, with the installation of a new electrical outlet, which circuit to connect the wires to, and whether additional work may be required. Similarly, different types of lighting may be associated with the installation of recess lighting, a new lighting fixture, or track lighting. Each of the options 147 requires different installations and may be associated with different suggested additions 149. Each option 147 may be associated with one or more images 148 that can be used in the 2D or 3D augmented reality presentation. In some instances, the images 148 may include a representation of an addition to the property, as well as a removal of a portion of the property, such as a wall. Where the improvement 143 is within a wall, such as electric wiring or plumbing, an indication or illustration on an existing wall may be mapped or otherwise indicated in the application 188.

As illustrated, the analysis engine 111 can be used by the improvement management application 108 to analyze and react to selections provided by consumers via the client device 180 and AR-enabled application 188. In some instances, the analysis engine 111 can be used to provide particular selections to the application 188 during initial and/or ongoing interactions. The analysis engine 111 may use the recommendation engine 114 to identify one or more recommendations for products 131 and improvements 143 for suggestions to the consumer based on the set of stored historical selections 150, which may store selections specific to the current consumer, as well as those of other consumers in different real estate. Each stored selection may include information about the consumer who selected those selections, the real estate, and other factors that may have caused the consumers to select them. Those selections can then be analyzed by the learning engine 113 to identify trends, common selections, and potential further items or actions that may be selected by the consumer. The learning engine 113 can store its results in the historical selections 150 of memory 120, and can allow the recommendation engine 114 and the analysis engine 111 to use any collected or identified insights when processing a current consumer's interactions and selections. When the analysis engine 111 interacts with a consumer, the consumer's user information 195 may also be analyzed by the analysis engine 111 to determine one or more items to be recommended, as well as to identify other similar consumers and their corresponding historical selections 150. Additionally, information related to the property itself can be analyzed to determine potential actions that a new owner may want to perform.

Information about specific properties can be stored in the real estate data 121 of memory 120. The real estate data 121 can include information about multiple pieces of real estate property, each associated or identified with a real estate identifier 122. The identifier 122 may be a location 123, such as an address or GPS location. In some instances, beacons or other unique identifiers inside of the property may be detected at the client device 180 and relayed to the improvement management application 108 by the AR-related application 188. The real estate property may be associated with a price 124, which can be used by the analysis engine 111 to determine the available budget for renovations and furnishings, based, for example, on a budget 196 of the user. For example, if the consumer has a budget of $400,000, and the property price 124 is $300,000, then the system will be intelligent in providing or suggesting additional products 131 and improvements 143 within the overall budget 196.

In some instances, particular properties may be associated with one or more schematics or layouts 125, which can be used by the improvement management application 108 to better understand particular additions or modifications to the property, as well as feasible modifications. In some instances, information about particular building codes, building requirements, and other relevant information may be included in the schematics 125. Those schematics 125, in some instances, to be used to illustrate where particular improvements 143 may need to be performed. For example, plumbing and electrical work can be illustrated at the correct locations based on the known information stored in the real estate data 121. The layouts 125 of the property may be architectural illustrations or surveys, and can be used to provide size information for different rooms and areas of the property. This information can be used to determine if and how particular furniture or other products 131 may fit within the property.

Further, area information 126 may provide information about the area in which the real estate property is located, including demographic information of residents (e.g., household incomes, etc.), crime rates and types of crime information, and other relevant information. In some instances, the area information 126 may be used by the analysis engine 111 and the recommendation engine 114 to determine one or more recommended products 131 or improvements 143 to the property. For example, in a high crime rate area, a security system or new locks may be recommended, and can be provided or otherwise indicated or visualized in the application 188. Similarly, if known information about other neighbors is available, information about what improvements others nearby have made may also be suggested or available for suggestion.

The live quote engine 112 provides functionality to allow the improvement management application 108 to connect with one or more contractor and/or retailer systems 170 in a live, real-time, or near-real-time communication, allowing consumers to identify particular improvements 143 and/or products 131 using the AR-enabled application 188 and then receive a specifically-tailored quote specific to their selected options. In some instances, each contractor or retailer system 170 may be associated with or include a live quote module 172. Using the live quote module 172, information selected by consumers can be relayed to the system 170, including particular selections. A representative of the related contractors or retailers can reply with a live quote, which can then be provided back to the consumer at the application 188. In some instances, a stored or estimated price 133 or 145 for the selected work may be initially identified based on stored values. The live quote module 172 can simultaneously identify contractors or retailers from the vendor lists 132, 144 associated with a particular product 131 or improvement 143. Information about a current quote or set of quotes may be returned to the consumer once an updated set of quotes are provided. In some instances, multiple contractors or retailers may compete using the quotes for particular products or improvements, such that the consumer can benefit from competition in the marketplace.

As illustrated and described, one or more clients 180 may be present in the example system 100. Each client 180 may include, be associated with, and/or execute a respective AR-enabled application 188 managed by the improvement management application 108 at the backend. In particular, and as described above, the AR-enabled application 188 can be used to provide consumers with the ability to select and view visualizations of one or more products or improvements to a property. Using the AR-enabled application 188, a view of a particular portion of the property can be captured and presented by the AR-enabled application 188 through GUI 190, where the images or live feed of the property is captured through camera 186 and associated processing. In some instances, the view may be a non-live view showing previously captured images or video, but which can be modified using the AR-enabled application 188. As illustrated, clients 180 may include an interface 182 for communication (similar to or different from interface 104), at least one processor 184 (similar to or different from processor 106), the AR-enabled application 188, one or more cameras 186, memory 192 (similar to or different from memory 120), a GPS 191 or other location determination functionality, and a graphical user interface (GUI) 190.

The illustrated client 180 is intended to encompass any computing device such as a desktop computer, laptop/notebook computer, mobile device, smartphone, personal data assistant (PDA), tablet computing device, one or more processors within these devices, or any other suitable processing device. In general, client 180 and its components may be adapted to execute any operating system, including Linux, UNIX, Windows, Mac OS®, Java™, Android™, or iOS. In some instances, client 180 may comprise a computer that includes an input device, such as a keypad, touch screen, camera 186, or other device(s) that can interact with the AR-enabled application 188, and output device(s) that convey information associated with the operation of the applications and their application windows to the user of the client 180. Such information may include digital data, visual information, or a GUI 190 as shown with respect to client 180. Specifically, client 180 may be any computing device operable to communicate queries or communications to the digital real estate system 102, other clients 180, and/or other components via network 160, as well as with the network 160 itself, using a wireline or wireless connection. In general, client 180 comprises an electronic computer device operable to receive, transmit, process, and store any appropriate data associated with the environment 100 of FIG. 1. In some instances, different clients 180 may be the same or different types or classes of computing devices. For example, at least one of clients 180 may be associated with a mobile device (e.g., a tablet), while at least one of the clients 180 may be associated with a desktop or laptop computing system. Any combination of device types may be used, where appropriate.

Camera 186 may be any suitable camera, including cameras integral to the client device 180, or an external component from which images and/or video can be obtained. The images and/or video may also be captured previously and can be used in the current application 188, where appropriate. The images and video can be provided to the AR-enabled application 188, which can relay the information to the improvement management system 108, where needed. The AR-enabled application 188 may be associated with a measurement app 189 or functionality, where the input from the camera 186 can be interpreted and estimated distances and dimensions can be determined, including distances, areas, and heights available for the placement of particular products 131 or the modifications required as associated with certain improvements 143. The dimension information 134, 146 can be compared to the measured distances as determined by the measurement app 189, and can be considered by the analysis engine 111.

In general, the AR-enabled application 188 may be any suitable application, program, mobile app, or other components. As illustrated, client application 188 interacts with the digital real estate system 102 to perform client-side operations associated with the improvement management application 108, and may be a client-side agent of the improvement management application 108, a mobile version of the improvement management application 108, or a mobile application associated with and allowing interaction with or execution of functionality associated with the improvement management application 108, in some instances. In some implementations, the AR-enabled application 188 may execute in an offline mode, or without a connection to the digital real estate system 102. Information related to a property and available products 131 and improvements 143 may be cached in memory 192 of the client device 180, or may be available in a limited or complete database locally available. Some functionality may be available while offline, while other information and functionality, such as a live quote, may only be available while online.

GUI 190 of client 180 can interface with at least a portion of the environment 100 for any suitable purpose, including generating a visual representation of the AR-enabled application 188 and its augmented reality presentation, as well as other content associated with AR-enabled application 188, including information about pricing of particular components, overall budgets, recommend or suggested additions, or other information related to the AR-enabled application 188, as well as other visual representations related to or not related to the digital real estate system 102. In particular, the GUIs 190 may be used to present screens or UIs associated with the AR-enabled application 188. The GUI 190 may also be used to view and interact with various Web pages, applications, and Web services located local or external to client 180. Generally, the GUI 190 provides users with an efficient and user-friendly presentation of data provided by or communicated within the system. GUI 190 may comprise a plurality of customizable frames or views having interactive fields, pull-down lists, and buttons operated by the user. For example, GUI 190 may provide interactive elements that allow a user to view or interact with information related to the operations of processes associated with the digital real estate system 102, including the presentation of and interaction with particular application data associated with the client application 188 and improvement management application 108, among others. In general, GUI 190 is often configurable, supports a combination of tables and graphs (bar, line, pie, status dials, etc.), and is able to build real-time portals, application windows, and presentations. Therefore, GUI 190 contemplates any suitable graphical user interface, such as a combination of a generic web browser, a web-enable application, intelligent engine, and command line interface (CLI) that processes information in the platform and efficiently presents the results to the user visually.

The GPS 191 or other location determination functionality may provide information about a particular location or real estate at which the client device 180 is located, particularly where the client device 180 is a mobile device. In those instances, the location information can be used to determine a particular property where the client device 180, and therefore the consumer, is located. Other location determination methods may also be used, including wireless network-based determinations of location, beacon-based determination, or other information. In some instances, a particular location or real estate may be specified manually instead, or the AR-enabled application 188 may interact with a particular property even when the consumer and his device 180 is not physically located there.

As noted, memory 192 may store a set of user information 195 that can be used to provide additional insights and information to the improvement management application 108. The budget 196 can be used to provide affordable suggestions or information about a property and different improvements, while the preferences 197 of the consumer can be used to ensure that any known preferences are considered and weighted appropriately. Memory 192 may also store or stream one or more real estate images 193 as captured by the camera 186, or additional real estate plans 194, such as the information about particular schematics or layouts 125 of particular real estate properties. The images 193 may be previously captured and can be used with the AR-enabled application 188, or they may be captured live by the AR-enabled application 188 and used to present an augmented reality-based presentation to the consumer. In some instances, the images 193 and plans 194 may be stored remotely from the client device 180, or may be downloaded in response to identification of the particular property.

The contractor and retailer systems 170 may be any suitable computing systems managed by respective contractors and retailers. In some instances, those systems 170 may be specifically integrated into or associated with the digital real estate system 102, or may execute a portion of end-to-end software associated with the digital real estate system 102. In some instances, those systems 170 may be business-to-business or business-to-consumer companies, and their information may be available or accessible to the improvement management application 108. In other instances, those systems 170 may be separate from the digital real estate system 102, but may be accessible via APIs or other connections to allow third-parties, including the digital real estate system 102, to access and retrieve information about those contractors and retailers, including the one or more catalogs 174. The live quote module 172 may be an application or part of another application that allows agents at those systems 170 to interact with the live quote engine 112 and provide information in response to requests from the digital real estate system 102 and particular consumers.

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2A:
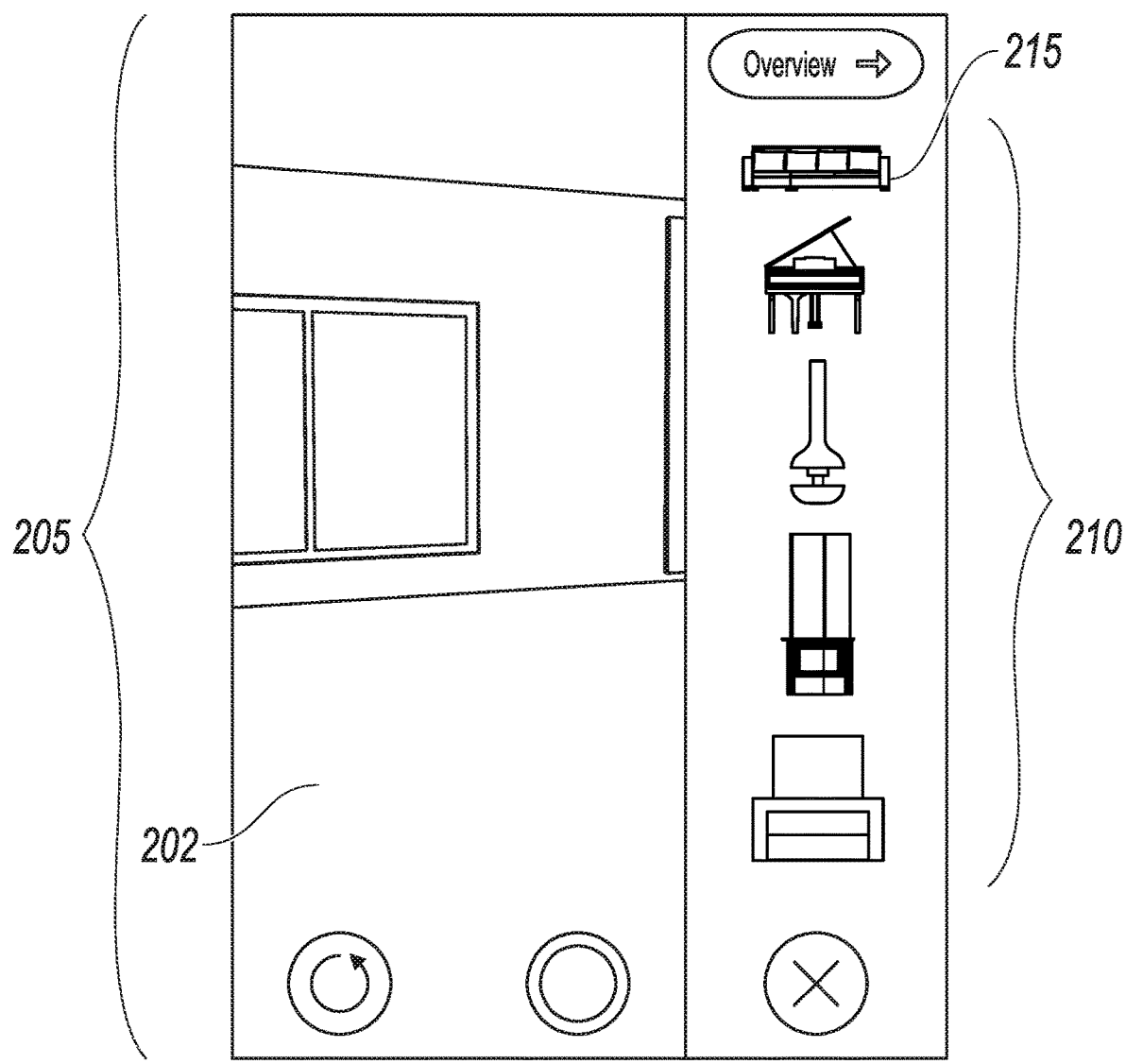
FIGS. 2A-C are example screenshots associated with an augmented reality-enabled real estate application in one example implementation.
Figure 2B:
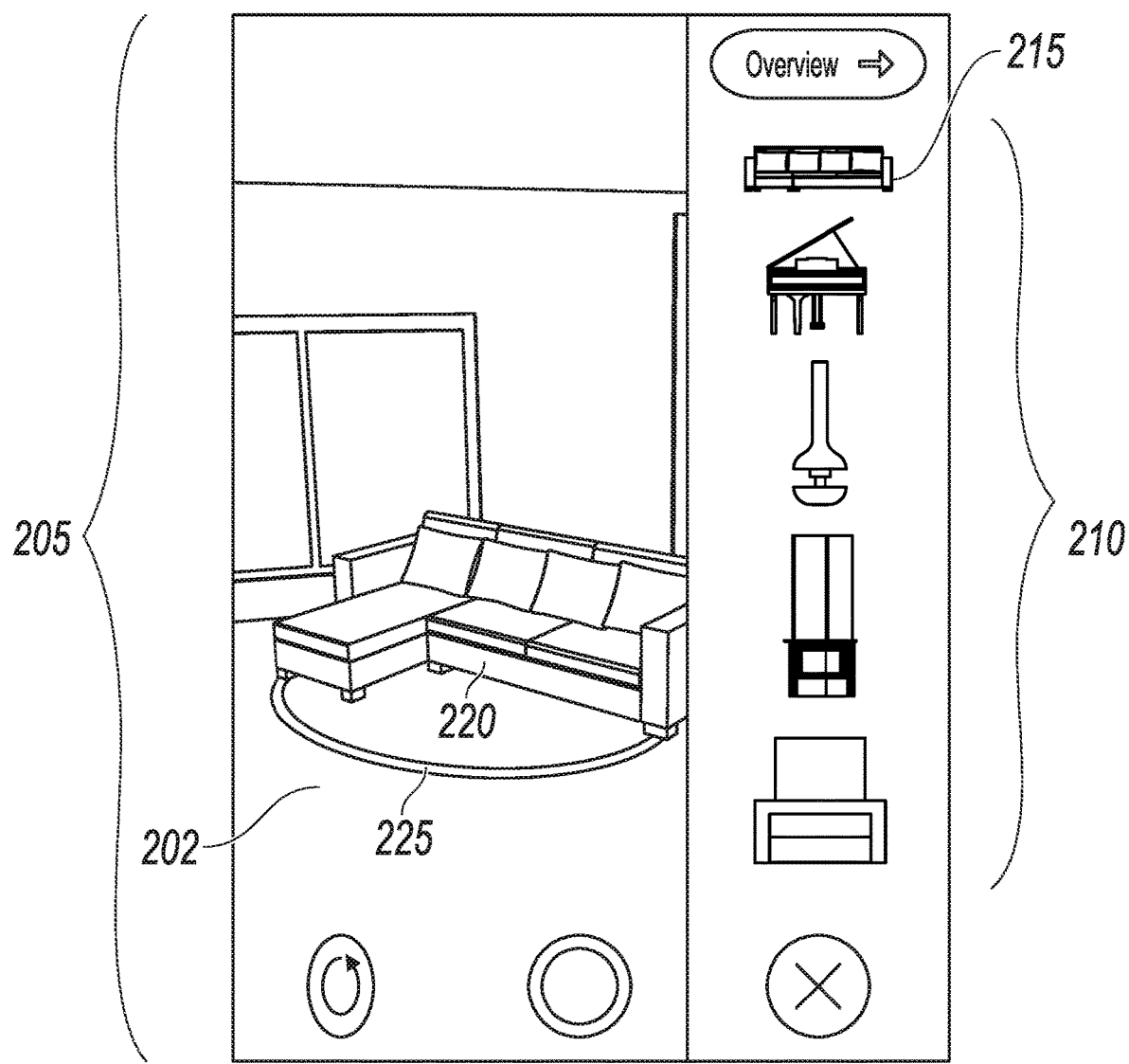
Figure 2C:
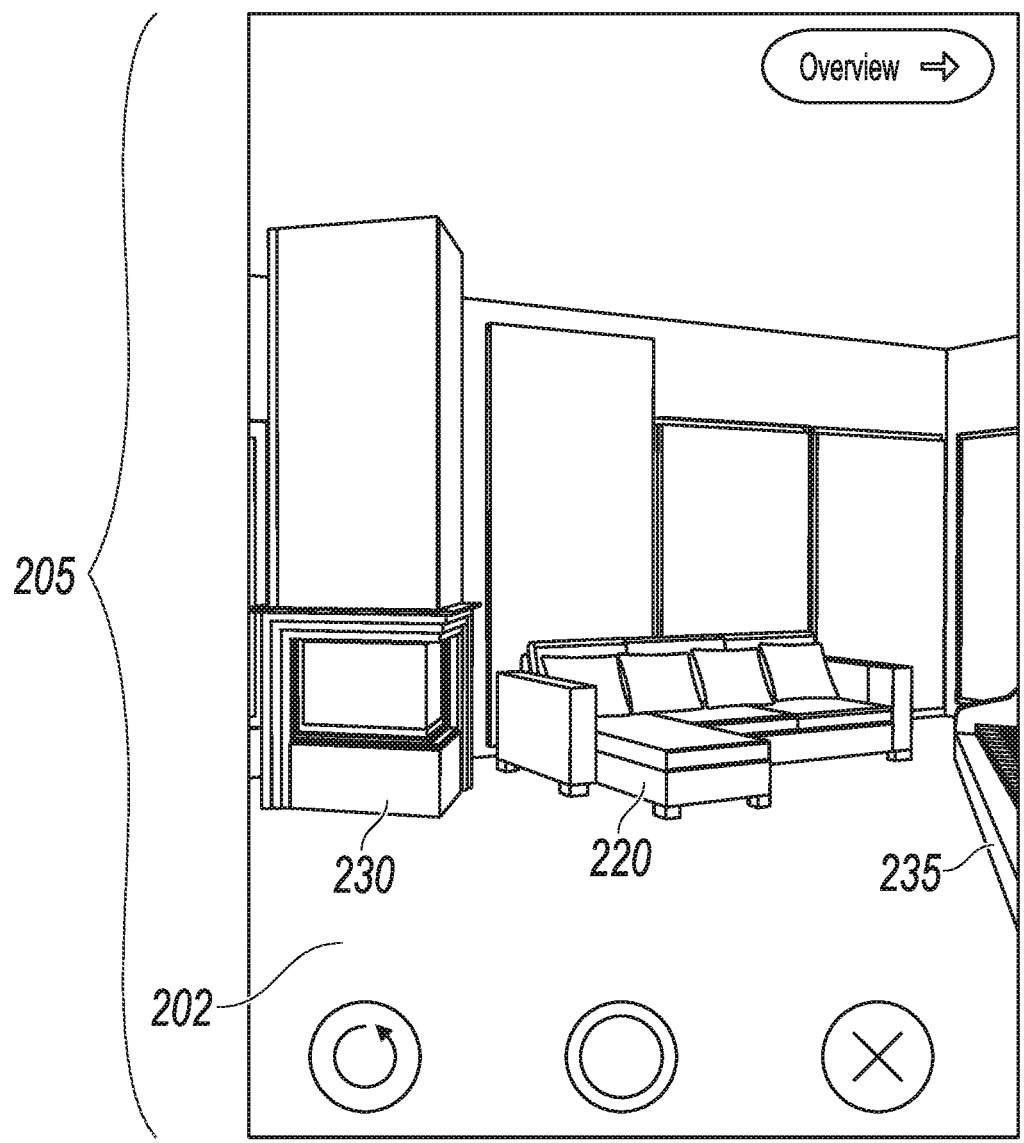

FIGS. 2A-C are example screenshots associated with an augmented reality-enabled real estate application in one example implementation. In FIG. 2A, an image 202 of the interior of a property is shown in area 205, which represents an interactive screen of an AR-enabled application. As shown on the right-side of the application in the selection area 210, a number of items are available for selection. The items include a couch, piano, and two fireplaces of different designs. The illustrated items are only an example—in some instances, a search functionality may be available for consumers to type in particular items to be included in the property. In some instances, these items may be suggested as possible items or improvements to the property based on the consumer's preference, an analysis of the demographic area of the property and other selections from other consumers in the area, or based on suggestions from the current home owner or realtor. The image 202 showing the area currently shows nothing but a clear room at the initial usage. The image 202 may be based on a current status of the room and based on an image captured via a mobile device. In other instances, the image 202 may be a previously captured image. While illustrated as presented on a mobile device, the image 202 may be presented in any suitable device, including a desktop system. As shown in FIG. 2A, the couch 215 has been touched or interacted by the consumer.

FIG. 2B illustrates the process of placing an improvement into the image 202 and represented area. The couch 215 may be activated or selected as in FIG. 2A, and then dragged or moved into the image 202. The couch 215 may be associated with a particular set of dimensions, and an area within the image 202 corresponding to those dimensions may be indicated by a halo 225 or other indication of the area necessary to place the couch 215. The halo 225 or other indication may allow users to understand or be provided information as to whether a particular selected improvement or product may fit within the selected space. In some instances, the application may determine whether the fit is appropriate, and can provide different color halos or other indicators showing whether a fit is made. The fit can be determined using the measuring functionality of the device, the application, or based on one or more schematics or layouts of the property, as well as based on any other selections already added to the image 202.

It should be noted that the application can store information about other selections added to the room or property that is currently being viewed. As the device or image is panned from one side to the other, the placed locations of other selections can be viewed, as well as the rest of the portion of the property. Using the augmented reality functionality of the mobile application, each selection and their placement within the location can be anchored and/or associated with a particular location. Once placed, particular selections remain in the same location as other selections and movements within the room are made. As illustrated, an AR-based representation of the couch 215 is shown as couch 220 once dragged onto the image 202. Once a particular selection is placed, the corresponding halo 225 or other indicator can disappear.

FIG. 2C shows image 202 with multiple selections added to the presentation. In particular, selections were made for a couch 220, a fireplace 230, and a piano 235. Each of the selections were made by the consumer, and were made in a sequential order. In some instances, the fireplace 230 may be a suggested addition after selection and placement of the couch 220. In some instances, a pop-up menu or side bar indication may have been presented in response to the couch 220 being placed. The suggestion may be based on other consumers' selections, the consumer's demographics, preferences, or profile, a paid advertisement or connection between the couch 220 and the fireplace 230, or any other connection or relationship.

In some instances, each selection and placement of a particular item may result in details about the particular item being presented, including details related to the price of the particular item, additional information regarding one or more choices, and/or other details. Further, one or more suggested items may be presented in response to a particular item being selected and placed. For example, the addition of a particular item, such as a piece of furniture, may be linked to or associated with another matching or related piece of furniture. In some instances, the additional furniture may be suggested or automatically placed near or in combination with the selected furniture. The additional furniture may include a preview of the additional piece(s), or may be placed and allow the consumer to remove if not wanted. Similarly, one or more physical improvements or modifications to the property may be associated with a selection. If a wine cooler or refrigerator is selected, for instance, some additional electrical and plumbing work may also be needed to install the selection. In those instances, a visualization or indication of the additional work can be provided with the selection, including where particular plumbing connections or electrical connections may be placed. If the work is likely required due to the nature of the selection, then those additions may be automatically included in the visualization. If optional, the indication may be clear of the particular options for installation. In some instances, the initial selection may be for a physical improvement to the real estate property. In those instances, certain selections may be made, such as removing a wall, remodeling a kitchen, or other options. Shapes and/or interactions with particular portions of the property can be selected and represented via augmented reality. If the particular area is known with which such a selection is made, then corresponding products or additional physical modifications may be suggested. In the kitchen remodel, for example, various appliances may be selected. If a particular style of dishwasher is selected, matching or related other appliances may be suggested as well. The interactive process can allow consumers the freedom to modify and revise their selections, while also receiving information about particular options, styles, and pricing. In situations where additional information is known about the consumer themselves, budget-specific selections may be offered and the budget impact may be presented, where appropriate.

Figure 3:
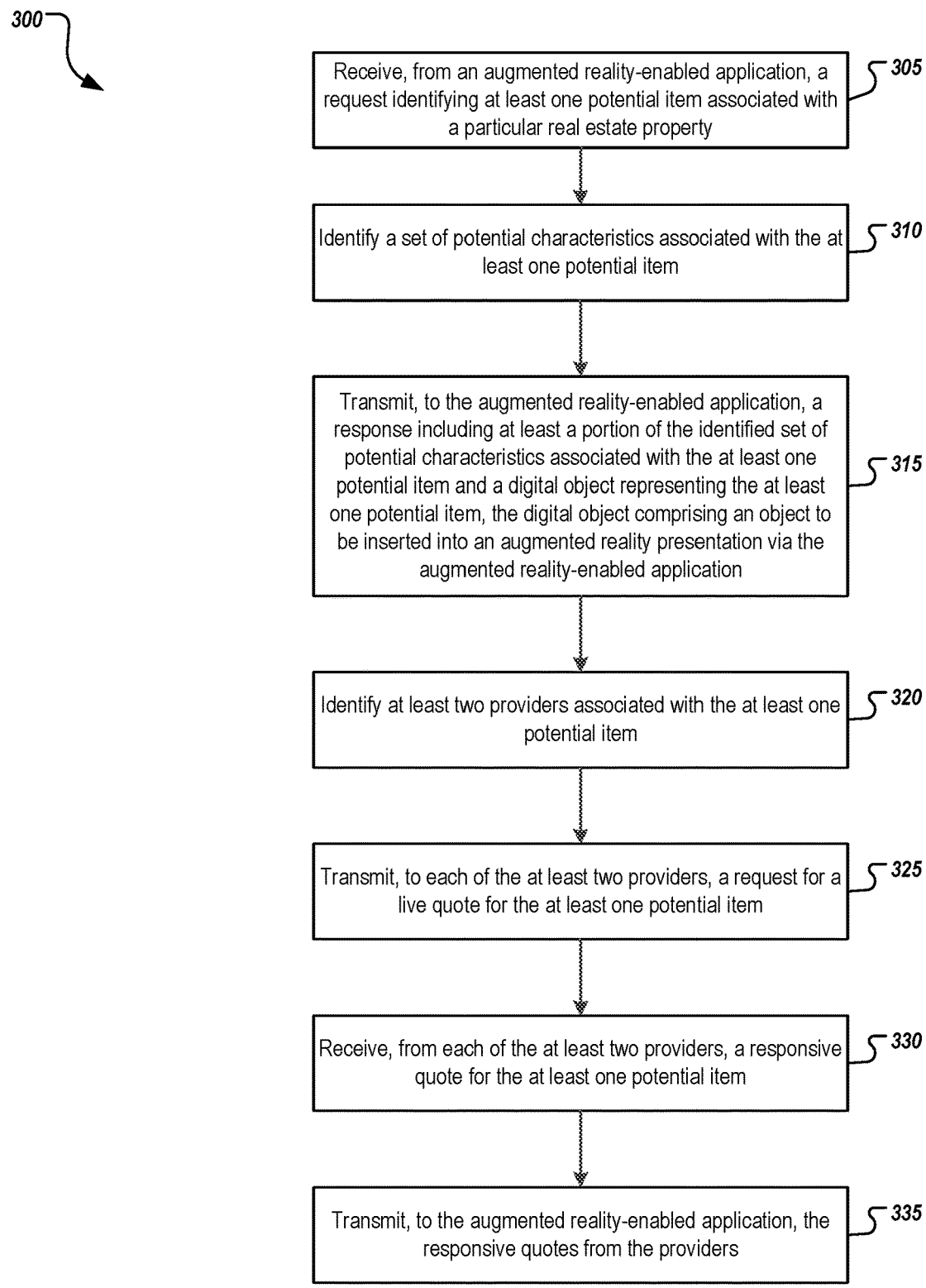
FIG. 3 is a flowchart of an example method for integrating one or more improvements into an augmented reality-based visualization of a real estate property.

FIG. 3 is a flowchart of an example method 300 for integrating one or more improvements into an augmented reality-based visualization of a real estate property. It will be understood that method 300 and related methods may be performed, for example, by any suitable system, environment, software, and hardware, or a combination of systems, environments, software, and hardware, as appropriate. For example, a system comprising a communications module, at least one memory storing instructions and other required data, and at least one hardware processor interoperably coupled to the at least one memory and the communications module can be used to execute method 300. In some implementations, the method 300 and related methods are executed by one or more components of the system 100 described above with respect to FIG. 1.

At 305, a request identifying at least one potential item associated with a real estate property is received. The request can be received via an augmented reality-enabled application, for instance, as executing at a mobile or other client device. The augmented reality-enabled application can be used to capture an image, including a live 3D image, of a room or a portion of a real estate property. Using the AR-enabled application, one or more items can be identified or selected as being virtually added to the property, and can then be visualized, via AR, within the image.

At 310, a set of potential characteristics associated with the at least one potential item can be identified. The potential characteristics can include various information associated with the selected or identified items. Example characteristics include a price, options associated with the selection (e.g., pricing, sizes, types, styles, etc.), as well as vendors, merchants, or contractors associated with the selected item. The selected item may be a product or a physical improvement or modification of the property. A product may include furniture and other furnishings, while the physical improvement may include any physical change to the property, from removing or moving walls to additions of electrical outlets or plumbing, the addition of windows, etc. In instances where different options are associated with a particular selection, those options can be identified and relevant information sets can be provided back to the AR-enabled application for review and consideration.

At 315, a response including at least a portion of the identified set of potential characteristics associated with the at least one potential item can be transmitted to the AR-enabled application for viewing by a consumer. In addition to those details, a digital object representing the at least one potential item can be identified and transmitted in the response, or in association with the response. The digital object comprises a digital object or artifact to be inserted into the augmented reality presentation via the AR-enabled application. The digital object can be a 2-D or 3-D object, and can be moved around the image or throughout the images of the property and be placed therein. In some instances, the digital object may be associated with a particular set of dimensions, such that a realistic representation of the size of the object can be realized in the AR-enabled application. The size of the location where the object is placed, as well as the location of other placed items within the location, can be considered as to whether a fit exists for placement of the item. In some instances, as shown in FIGS. 2A-C, an indicator may be presented as the item is being placed to indicate whether enough room is available, using a halo, an outline, or a color indication of the item to distinguish between currently acceptable locations and unacceptable locations.

It may be optionally determined that multiple providers are associated with a particular item, whether it be a product or a physical improvement. In such instances, the price initially provided for an addition may be an estimate based on historical or static information. In some instances, a live quote process may be available from one or more providers based on information obtained about the location and the selected item. For example, different vendors or contractors may offer the same product or service associated with a physical improvement. Where that occurs, or in cases where only a single vendor is associated with a physical improvement, a more accurate quote may be obtained. In those instances, at 320, the at least two providers may be identified as associated with or able to provide the selected item. A request for a live quote for the at least one potential item can be transmitted to each of the at least two providers, where available, at 325. Those providers may each elect to provide a more detailed quote in response to the request, either through a dedicated application or interface, or via other communication channels. At 330, responsive quotes can be received from at least one of those providers as updated or more detailed quotes for the selected item. The responsive quotes, or portions thereof, can then be transmitted back to the AR-enabled application to provide additional information to the consumer about potential costs at 335.

In some instances, the at least one potential item may be a particular product that is to be placed or added to the particular real estate property. Examples, as noted, may be furniture, accessories, electronics, and other items. In some of those instances, identifying the set of potential characteristics of the item may include accessing a product catalog of one or more retailers who are associated with the product. The additional characteristics of the product, including an image of the selection, may be obtained from the product catalog, and can include a current price of the product. Other potential characteristics, including alternative options and similar models or versions, may be identified from the catalog, or by a shopping assistant associated with the product catalog. In some instances, multiple catalogs associated with different retailers may be available, while in others, contents of the catalogs may be obtained and stored at a backend portion of the AR-enabled application. If additional options are desired, the system may then access the product catalogs of particular retailers to identify additional potential products. In some instances, the prices of the selected product may be compared from the catalogs between the at least two retailers, and a best option may be presented or made available to the consumer. In some instances, where two or more options are available for a particular product, the response transmitted to the AR-enabled application at 315 can include information about each option, and can allow the consumer to select one of the options. In those instances, digital objects corresponding to each of the objects may be transmitted, or the objects may be obtained after specific options are selected or requested for preview.

In some instances, the at least one potential item may be a particular physical improvement or modification to the particular real estate property, such as a change to the physical structure or facade of the real estate. In those instances, identifying the set of characteristics associated with the at least one potential item can comprise identifying at least one contractor or service provider associated with or capable of providing the improvement selected. In some instances, the particular contractor may be selected based on a geographic location of the real estate property, where particular contractors are associated with particular improvements and geographic areas. When those improvements are selected in that area, the information about the particular improvement will be based on those contractors. In that case, a price or estimated cost associated with the selected improvement can be obtained from the at least one contractor. In instances where two or more contractors are associated with a particular improvement, the costs from each of the contractors can be identified and two different quotes may be provided.

In some instances, the digital object representing the at least one potential item is associated with a set of dimensions, such as a length, width, and height, among others. The AR-enabled application may be configured to determine dimensions of a location in the real estate property at which a particular item is to be placed. A determination can then be made as to whether the set of dimensions of the digital object can fit within the dimensions of the particular location. When the object is trying to be placed in the location, the AR-enabled application can provide an indication of the determination while the item is being placed. For example, a color-coded indication may be provided, where the margins of the digital object are green if the item will fit, or red if the item will not fit. In some instances, if no fit is possible, a similar item may be suggested instead, where the suggested item is a similar, but different sized or dimensioned object that can be placed in the location. Alternatively, the consumer may be able to modify the location in which the item is to be placed, or one or more physical improvements or modifications may be proposed that would create the necessary space to fit the dimensions of the item.

In some instances, in response to receiving the request identifying the at least one potential item, the method may further comprise identifying at least one additional item for suggestion based on the selection of a particular item. In some instances, the additional items suggested may already be linked with the selected item, and proposed for further inclusion in the property. In other instances, the additional items suggested may be additional modifications to the property required if the selected item is added to the location. In some instances, the initially selected item may be a product, while the suggested addition may be related physical improvements or modifications to the property. In other instances, the initially selected item may be a product, and the suggested additional item may also be a related product, or a product that has been identified as related to the initially selected product. In still other instances, the initially selected item may be a physical modification of the property, and the suggested addition may be further improvements or a product that can be added in response to the physical improvement (e.g., moving a wall may offer a suggestion of cabinets or additional storage or furniture, among others). Once identified, a notification associated with the recommendation of the at least one additional item can be transmitted to the AR-enabled application. In some instances, that notification can include a digital object corresponding to any additional items, and in some cases, can include actual placement or inclusion of the digital objects into the AR visualization.

In many of the described instances, visualizations and suggestions of new items and/or improvements are presented within the real estate property. However, in addition to new items, the consumer's current inventory or possessions, such as their current furniture or electronics, may be the source of recommendations for improvements. As some consumers may be attached to or otherwise want to keep their current furnishings, electronics, and/or accessories, they may wish to take them with them when moving from one location to another. The list of furniture may be stored with an existing set of user information, and may be initially identified for additions when a consumer initiates an AR-enabled application at or for a particular property. The solution may be able to learn about legacy furniture and other items by performing an image or visual scan of the existing items, or by selecting those items from a list during initiation of the AR-enabled application. In some instances, the particular furniture or item may be identified automatically based on a scan of the consumer's current living or other space. In doing so, even where exact matches for the items cannot or are not identified, specific dimensions of the items may be identified and used to determine, at the new property, whether there is space available for those items (e.g., a piano), whether the items can be moved into the space, and whether the space is appropriate or would look satisfactory with the items included. Further, other non-furniture items may be included, such as identifying an electric car driven by the consumer. When viewing a garage through the AR-enabled application, a corresponding visualization of a charging box or battery can be presented or suggested in the garage. Other similar suggestions and visualizations can be presented, including how electronics may be positioned on certain walls, what connections may be needed to allow those to work, and other suitable visualizations.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or performing additional operations, fewer operations, and/or different operations, so long as the methods and systems remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method, the method comprising:

receiving, at a digital real estate system and from an augmented reality-enabled application executing on a client device, a request identifying at least one digital improvement to be associated with an augmented reality-based presentation of a particular real estate property;

in response to receiving the request:
identifying, by the digital real estate system, a first set of characteristics, the first set of characteristics associated with the at least one identified digital improvement;

identifying, by a learning engine of the digital real estate system, at least one construction-related physical improvement to the particular real estate property corresponding to the at least one identified digital improvement based on at least one learned association; and identifying, by the digital real estate system, a second set of characteristics, the second set of characteristics associated with the at least one construction-related physical improvement, the first set of characteristics associated with the at least one identified digital improvement, and information related to the particular real estate property; and transmitting, by the digital real estate system and to the augmented reality-enabled application executing on the client device, a response including a subset of the identified first and second set of characteristics, a first digital object representing the at least one digital improvement, and a second digital object representing the at least one construction-related physical improvement, wherein the first digital object and the second digital object are configured to be visually inserted in the augmented reality-based presentation of the particular real estate property presented on the client device using the augmented reality-enabled application.

2. The method of claim 1, wherein the at least one digital improvement comprises a particular product to be placed within the augmented reality-based presentation of the particular real estate property.

3. The method of claim 2, wherein identifying the first set of characteristics associated with the at least one digital improvement comprises:

accessing a product catalog associated with at least one retailer associated with the particular product; and identifying the first set of characteristics associated with the particular product, wherein the identified first set of characteristics associated with the particular product includes at least one price of the particular product.

4. The method of claim 3, wherein the product catalog includes two or more retailers associated with the particular product, and wherein the identified first set of characteristics associated with the particular product includes an indication of the prices offered by each of the two or more retailers.

5. The method of claim 3, wherein the identified first set of characteristics associated with the at least one digital improvement includes at least two selectable options associated with the particular product, and wherein transmitting the response includes transmitting at least a portion of the identified first set of characteristics associated with each of the at least two selectable options for the at least one digital improvement and the at least two selectable options, and wherein the at least two selectable options are to be visually inserted in the augmented reality-based presentation of the particular real estate property presented on the client device using the augmented reality-enabled application.

6. The method of claim 2, wherein the particular product to be placed comprises an appliance, and wherein the at least one construction-related physical improvement relates to placement or installation of the appliance, and the information relates to at least one schematic associated with the particular real estate property related to a layout of an installation location or a placement location of the appliance.

7. The method of claim 1, wherein the at least one construction-related physical improvement comprises a physical improvement to be made within the particular real estate property, and wherein the second digital object representing the at least one construction-related physical improvement comprises a visual modification to a portion of the particular real estate property associated with the physical improvement within the augmented reality-based presentation of the particular real estate property.

8. The method of claim 7, wherein identifying the second set of characteristics associated with the at least one construction-related physical improvement comprises:

identifying at least one contractor associated with a geographic area in which the particular real estate property is located and registered as capable of performing the physical improvement; and obtaining a price associated with the physical improvement from the at least one identified contractor, wherein the response includes the obtained price.

9. The method of claim 8, wherein at least two different contractors are identified, and wherein obtaining the price associated with the physical improvement from the at least two different contractors comprises identifying at least two different quotes for the physical improvement.

10. The method of claim 1, wherein identifying the first set of characteristics associated with the at least one digital improvement comprises:

identifying two or more providers associated with the at least one digital improvement associated with the particular real estate property;

transmitting, to each of the two or more providers, a request for a real-time quote associated with the at least one digital improvement;

receiving, from each of the two or more providers, quotes for the at least one digital improvement; and transmitting, to the augmented reality-enabled application, information associated with the received quotes for presentation.

11. The method of claim 1, wherein the first digital object representing the at least one digital improvement is associated with a set of dimensions, wherein the augmented reality-enabled application is configured to:

determine dimensions of a location within the particular real estate property at which the at least one digital improvement is to be placed;

determine whether the set of dimensions of the first digital object representing the at least one digital improvement can fit within the dimensions of the location within the particular real estate property; and present, within an augmented reality presentation, an indication of the determination whether the set of dimensions of the first digital object representing the at least one digital improvement can fit within the dimensions of the location within the particular real estate property.

12. The method of claim 1, wherein identifying the first and second set of characteristics are associated with at least one contractor system or retailer system.

13. The method of claim 1, wherein, in response to receiving the request identifying the at least one digital improvement to be associated with the augmented reality-based presentation of the particular real estate property, the method further comprises:

identifying at least one additional digital improvement based on the identification of the at least one digital improvement; and transmitting, to the augmented reality-enabled application, a notification associated with a recommendation of the at least one additional digital improvement for presentation via the augmented reality-enabled application, wherein the notification includes a first digital object representing the at least one identified additional digital improvement.

14. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, at a digital real estate system and from an augmented reality-enabled application executing on a client device, a request identifying at least one digital improvement to be associated with an augmented reality-based presentation of a particular real estate property;
in response to receiving the request:
identifying, by the digital real estate system, a first set of characteristics, the first set of characteristics associated with the at least one identified digital improvement;
identifying, by a learning engine of the digital real estate system, at least one construction-related physical improvement to the particular real estate property corresponding to the at least one identified digital improvement based on at least one learned association; and
identifying, by the digital real estate system, a second set of characteristics, the second set of characteristics associated with the at least one construction-related physical improvement, the first set of characteristics associated with the at least one identified digital improvement, and information related to the particular real estate property; and
transmitting, by the digital real estate system and to the augmented reality-enabled application executing on the client device, a response including a subset of the identified first and second set of characteristics, a first digital object representing the at least one digital improvement, and a second digital object representing the at least one construction-related physical improvement, wherein the first digital object and the second digital object are configured to be visually inserted in the augmented reality-based presentation of the particular real estate property presented on the client device using the augmented reality-enabled application.

15. The system of claim 14, wherein the at least one digital improvement comprises a particular product to be placed within the augmented reality-based presentation of the particular real estate property, and wherein identifying the first set of characteristics associated with the at least one digital improvement comprises:
accessing a product catalog associated with at least one retailer associated with the particular product; and
identifying the first set of characteristics associated with the particular product, wherein the identified first set of characteristics associated with the particular product includes at least one price of the particular product, wherein the product catalog includes two or more retailers associated with the particular product, and wherein the identified first set of characteristics associated with the particular product includes an indication of the prices offered by each of the two or more retailers.

16. The system of claim 14, wherein the at least one construction-related physical improvement comprises a physical improvement to be made within the particular real estate property, and wherein the second digital object representing the at least one construction-related physical improvement comprises a visual modification to a portion of the particular real estate property associated with the physical improvement within the augmented reality-based presentation of the particular real estate property.

17. The system of claim 16, wherein identifying the second set of characteristics associated with the at least one construction-related physical improvement comprises:
identifying at least one contractor associated with a geographic area in which the particular real estate property is located and registered as capable of performing the physical improvement; and
obtaining a price associated with the physical improvement from the at least one identified contractor, wherein the response includes the obtained price.

18. The system of claim 14, wherein identifying the first set of characteristics associated with the at least one identified digital improvement comprises:
identifying two or more providers associated with the at least one digital improvement associated with the particular real estate property;
transmitting, to each of the two or more providers, a request for a real-time quote associated with the at least one digital improvement;
receiving, from each of the two or more providers, quotes for the at least one digital improvement; and
transmitting, to the augmented reality-enabled application, information associated with the received quotes for presentation.

19. The system of claim 14, wherein the first digital object representing the at least one digital improvement is associated with a set of dimensions, wherein the augmented reality-enabled application is configured to:
determine dimensions of a location within the particular real estate property at which the at least one digital improvement is to be placed;
determine whether the set of dimensions of the first digital object representing the at least one digital improvement can fit within the dimensions of the location within the particular real estate property; and
present, within an augmented reality presentation, an indication of the determination whether the set of dimensions of the first digital object representing the at least one digital improvement can fit within the dimensions of the location within the particular real estate property.

20. A non-transitory computer storage medium encoded with a computer program, the program comprising instructions that, when executed by one or more computers, cause the one or more computers to perform operations comprising:
receiving, at a digital real estate system and from an augmented reality-enabled application executing on a client device, a request identifying at least one digital improvement to be associated with an augmented reality-based presentation of a particular real estate property;
in response to receiving the request:
identifying, by the digital real estate system, a first set of characteristics, the first set of characteristics associated with the at least one identified digital improvement;

identifying, by a learning engine of the digital real estate system, at least one construction-related physical improvement to the particular real estate property corresponding to the at least one identified digital improvement based on at least one learned association; and identifying, by the digital real estate system, a second set of characteristics, the second set of characteristics associated with the at least one construction-related physical improvement, the first set of characteristics associated with the at least one identified digital improvement, and information related to the particular real estate property; and transmitting, by the digital real estate system and to the augmented reality-enabled application executing on the client device, a response including a subset of the identified first and second set of characteristics, a first digital object representing the at least one digital improvement, and a second digital object representing the at least one construction-related physical improvement, wherein the first digital object and the second digital object are configured to be visually inserted in the augmented reality-based presentation of the particular real estate property presented on the client device using the augmented reality-enabled application.

* * * * *